United States Patent
Yamamura

(10) Patent No.: US 11,145,274 B2
(45) Date of Patent: Oct. 12, 2021

(54) COLOR DIFFERENCE ADJUSTMENT IMAGE DATA GENERATION METHOD, COLOR DIFFERENCE ADJUSTMENT IMAGE DISPLAY METHOD, COLOR DIFFERENCE ADJUSTMENT IMAGE DATA GENERATING DEVICE, AND COLOR DIFFERENCE ADJUSTMENT IMAGE DISPLAY SYSTEM

(71) Applicant: SANYO-CYP CO., LTD., Osaka (JP)

(72) Inventor: Kenji Yamamura, Osaka (JP)

(73) Assignee: SANYO-CYP CO., LTD., Osaka (JP)

( * ) Notice: Subject to any disclaimer, the term of this patent is extended or adjusted under 35 U.S.C. 154(b) by 0 days.

(21) Appl. No.: 16/964,968

(22) PCT Filed: Jan. 24, 2019

(86) PCT No.: PCT/JP2019/002369
§ 371 (c)(1),
(2) Date: Jul. 24, 2020

(87) PCT Pub. No.: WO2019/146728
PCT Pub. Date: Aug. 1, 2019

(65) Prior Publication Data
US 2021/0043160 A1    Feb. 11, 2021

(30) Foreign Application Priority Data

Jan. 25, 2018  (JP) .............................. JP2018-010503

(51) Int. Cl.
*G09G 5/06* (2006.01)
*G09G 3/20* (2006.01)
*H04N 9/79* (2006.01)

(52) U.S. Cl.
CPC ............. *G09G 5/06* (2013.01); *G09G 3/2003* (2013.01); *H04N 9/7904* (2013.01); *G09G 2320/0666* (2013.01); *G09G 2320/0693* (2013.01)

(58) Field of Classification Search
CPC ................... G09G 5/06; G09G 3/2003; G09G 2320/0666; G09G 2320/0693; H04N 9/7904
See application file for complete search history.

(56) References Cited

U.S. PATENT DOCUMENTS

| | | |
|---|---|---|
| 5,579,031 A | 11/1996 | Liang |
| 6,956,580 B2 | 10/2005 | Rozzi |

(Continued)

FOREIGN PATENT DOCUMENTS

| | | |
|---|---|---|
| CN | 1513167 A | 7/2004 |
| JP | H07-077954 A | 3/1995 |

(Continued)

OTHER PUBLICATIONS

International Search Report issued in PCT/JP2019/002369; dated Apr. 23, 2019.

*Primary Examiner* — Robert J Michaud
(74) *Attorney, Agent, or Firm* — Studebaker & Brackett PC

(57) ABSTRACT

A color difference adjustment image data generation method includes generating a color signal conversion table, generating adjusted image data, and generating color difference adjustment image data. The color signal conversion table is used for converting color signals in one of a color difference adjustment image data generating device and a display device into color signals in the other. The adjusted image data is generated by adjusting image data of a display object so that color of an image of the display object being displayed by the color difference adjustment image data (Continued)

generating device according to the image data matches color of the display object. The color difference adjustment image data is generated based on the adjusted image data and the color signal conversion table.

15 Claims, 6 Drawing Sheets

(56) References Cited

U.S. PATENT DOCUMENTS

2002/0180751 A1* 12/2002 Rozzi ..................... H04N 1/603
345/589
2014/0185927 A1* 7/2014 Kawabata ................. G06T 7/90
382/162

FOREIGN PATENT DOCUMENTS

| JP | 2000-020681 | A | 1/2000 |
| JP | 2004-535597 | A | 11/2004 |
| JP | 2016-061876 | A | 4/2016 |

* cited by examiner

COLOR DIFFERENCE ADJUSTMENT IMAGE DATA GENERATION METHOD, COLOR DIFFERENCE ADJUSTMENT IMAGE DISPLAY METHOD, COLOR DIFFERENCE ADJUSTMENT IMAGE DATA GENERATING DEVICE, AND COLOR DIFFERENCE ADJUSTMENT IMAGE DISPLAY SYSTEM

TECHNICAL FIELD

The present invention relates to a color difference adjustment image data generation method, a color difference adjustment image display method, a color difference adjustment image data generating device, and a color difference adjustment image display system.

BACKGROUND ART

Electronic commerce has become more and more popular these days, and trading partners have increasing opportunities to proceed with a commercial transaction without directly confirming an object to be traded. In this case, the trading partners generally cause a display device to display the object in order to confirm the object to proceed with the commercial transaction.

It is however known that color of an image of a display object being displayed by the display device may strictly differ from color of the display object itself. Important factors in for example clothing, shoes, cosmetics, ornaments, and the like include color. Color of each of these objects is however difficult for display devices to sufficiently reproduce, which raises a problem that makes it difficult to proceed with a good commercial transaction.

Also in recent years, remote diagnosis and remote treatment using a display device have been promoted. Also in this case, important factors in decision on medical examination and/or treatment include a patient's complexion and/or color of the affected area. However, display devices have not been able to sufficiently reproduce color of each of these objects.

It is therefore required that a color image of a display object being displayed by a display device reproduces color of the display object itself. For example, it is known that an ambient light sensor is attached to an image display device and detects an image displayed by the image display device according to image data, thereby enabling calibration of the image data (see Patent Literature 1). In Patent Literature 1, the ambient light sensor itself is calibrated, and the color image of the display object being displayed by the display device reproduces the color of the display object itself.

CITATION LIST

Patent Literature

[Patent Literature 1]
JP 2016-61876 A

SUMMARY OF INVENTION

Technical Problem

The image display device of Patent Literature 1 however needs to attach the ambient light sensor to the image display device. Otherwise, in general display devices, a color image of a display object being displayed is difficult to reproduce color of the display object itself.

The present invention has been achieved in view of the above circumstances, and an object thereof is to provide a color difference adjustment image data generation method, a color difference adjustment image display method, a color difference adjustment image data generating device, and a color difference adjustment image display system, capable of displaying a color image of a display object being displayed by a display device with high color reproducibility.

Solution to Problem

A color difference adjustment image data generation method according to an aspect of the present invention includes generating a color signal conversion table, generating adjusted image data, and generating color difference adjustment image data. In the generating a color signal conversion table, the color signal conversion table is used for converting color signals in one of a color difference adjustment image data generating device and a display device into color signals in an other of the color difference adjustment image data generating device and the display device. In the generating adjusted image data, the adjusted image data is generated by adjusting image data of a display object so that color of an image of the display object being displayed by the color difference adjustment image data generating device according to the image data of the display object matches color of the display object. In the generating color difference adjustment image data, the color difference adjustment image data is generated based on the adjusted image data and the color signal conversion table.

In the generating color difference adjustment image data in an embodiment, the color difference adjustment image data contains the adjusted image data and the color signal conversion table.

In an embodiment, the generating a color signal conversion table includes measuring color of an image that the color difference adjustment image data generating device displays according to standard color signal data, measuring color of an image that the display device displays according to the standard color signal data, and generating the color signal conversion table so that the color of the image displayed by the display device matches the color of the image displayed by the color difference adjustment image data generating device.

In an embodiment, the generating adjusted image data includes capturing the image of the display object to generate the image data, and adjusting the image data to generate the adjusted image data.

A color difference adjustment image display method according to an aspect of the present invention includes generating a color signal conversion table, generating adjusted image data, generating color difference adjustment image data, and displaying an image of a display object. In the generating a color signal conversion table, the color signal conversion table is used for converting color signals in one of a color difference adjustment image data generating device and a display device into color signals in an other of the color difference adjustment image data generating device and the display device. In the generating adjusted image data, the adjusted image data is generated by adjusting image data of the display object so that color of an image being displayed by the color difference adjustment image data generating device according to the image data of the display object matches color of the display object. In the generating color difference adjustment image data, the color difference adjustment image data is generated based on the adjusted image data and the color signal conversion table. In the displaying an image of a display object, the display device displays the image of the display object based on the color difference adjustment image data.

In an embodiment, the color difference adjustment image display method further includes setting a display screen of the display device before the display device displays the image of the display object.

In an embodiment, in the setting a display screen of the display device, the display screen of the display device is set to be the same as a display screen of the display device when the color signal conversion table was generated.

A color difference adjustment image data generating device according to an aspect of the present invention includes storage, a display section, and a controller. The controller controls the display section. The storage stores image data of a display object and a color signal conversion table for converting color signals in one of the color difference adjustment image data generating device and a display device into color signals in an other of the color difference adjustment image data generating device and the display device. The storage stores adjusted image data generated by adjusting the image data so that color of an image of the display object being displayed by the display section according to the image data matches color of the display object. The controller generates color difference adjustment image data based on the adjusted image data and the color signal conversion table.

A color difference adjustment image display system according to an aspect of the present invention includes a color difference adjustment image data generating device and a display device. The color difference adjustment image data generating device stores image data of a display object and a color signal conversion table for converting color signals in one of the color difference adjustment image data generating device and the display device into color signals in an other of the color difference adjustment image data generating device and the display device. The color difference adjustment image data generating device generates adjusted image data by adjusting the image data so that color of an image of the display object being displayed by the color difference adjustment image data generating device according to the image data matches color of the display object. The color difference adjustment image data generating device generates color difference adjustment image data based on the adjusted image data and the color signal conversion table. The display device displays an image of the display object based on the color difference adjustment image data.

Advantageous Effects of Invention

The display device in the present invention can display the color image of the display object with high color reproducibility.

DESCRIPTION OF EMBODIMENTS

Figure 1:
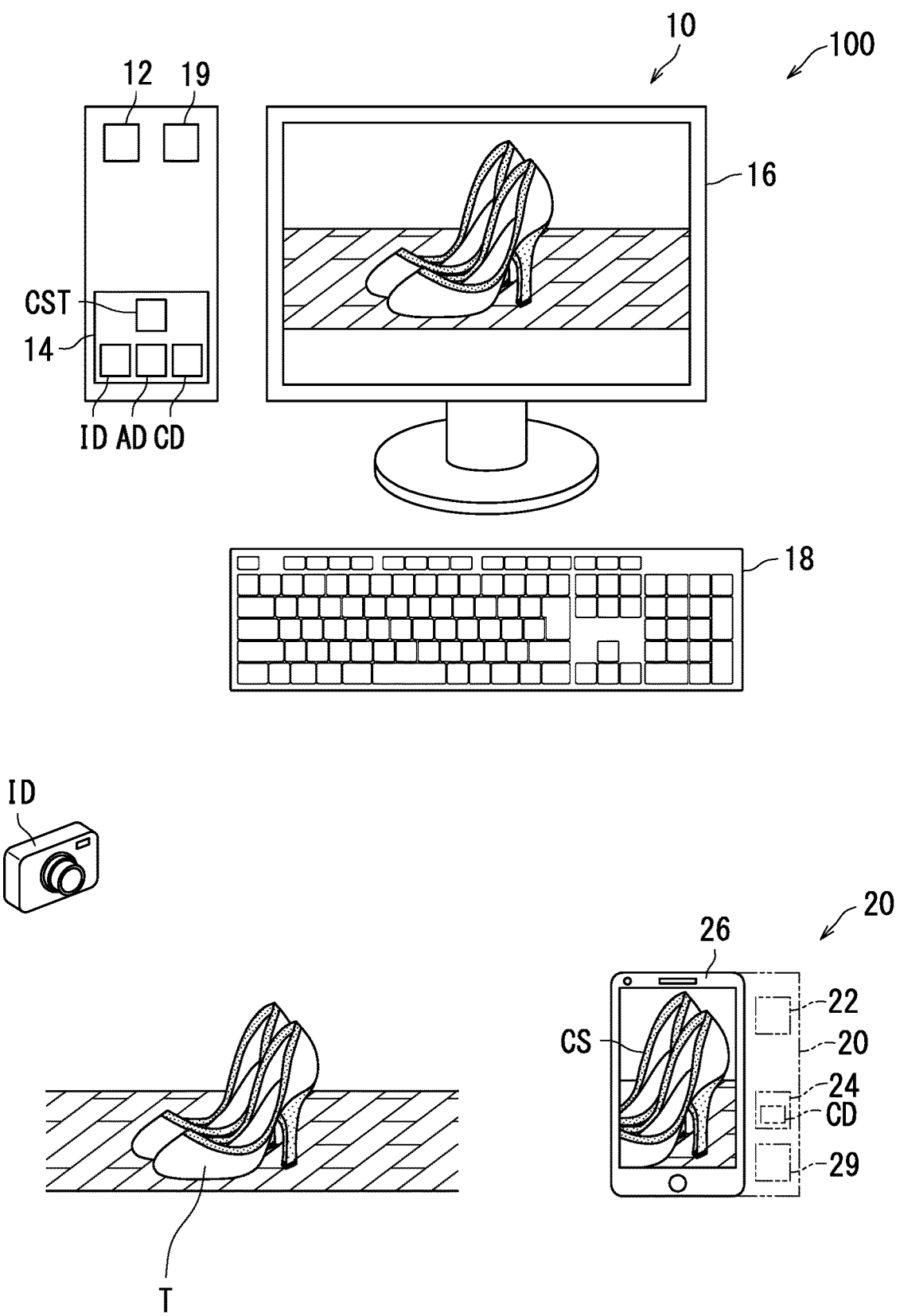
FIG. 1 is a schematic illustration of a color difference adjustment image display system according to an embodiment of the present invention.

An embodiment of the present invention will hereinafter be described with reference to the accompanying drawings. Elements that are the same or equivalent are labelled with the same reference signs in the drawings and description thereof is not repeated.

A color difference adjustment image data generating device 10 and a color difference adjustment image display system 100 according to the embodiment of the present invention will hereinafter be described with reference to FIG. 1. FIG. 1 is a schematic illustration depicting the color difference adjustment image display system 100 according to the present embodiment. The color difference adjustment image display system 100 includes the color difference adjustment image data generating device 10 and a display device 20.

The color difference adjustment image data generating device 10 generates color difference adjustment image data CD. The color difference adjustment image data generating device 10 generates color difference adjustment image data CD of a display object T from image data ID of the display object T. The color difference adjustment image data CD is adjusted to allow the display device 20 to display an image that reproduces color of the display object T.

The display device 20 displays an image CS of the display object T based on the color difference adjustment image data CD. The display device 20 can display the image CS that reproduces the color of the display object T according to the color difference adjustment image data CD.

The color difference adjustment image data generating device 10 includes a controller 12, storage 14, a display section 16, and an input section 18. The controller 12 controls the display section 16.

The controller 12 includes a processor. The processor includes for example a central processing unit (CPU). Alternatively, the processor may include a general-purpose arithmetic unit.

The storage 14 stores therein the image data ID and computer programs. The storage 14 also stores therein a color signal conversion table CST to be described later. The storage 14 includes main memory and an auxiliary storage device. The main memory is for example semiconductor memory. Examples of the auxiliary storage device include semiconductor memory and a hard disk drive. The storage 14 may include a removable medium. The image data ID includes color signals. For examples, each of the color signals is represented by RGB. The controller 12 executes a computer program stored in the storage 14 to implement a color difference adjustment image data generation method according to the present embodiment.

The display section 16 displays an image. The controller 12 controls the display section 16 so that the display section 16 displays an image according to the image data ID stored in the storage 14.

Information on adjustment of the image data ID stored in the storage 14 is input to the input section 18. The input section 18 allows a user to enter the information on the adjustment of the image data ID. The storage 14 stores therein adjusted image data AD generated by adjusting the image data ID. The display section 16 displays an image according to the adjusted image data AD. The input section 18 may be a touch sensor integrally attached to the display section 16.

Preferably, the color difference adjustment image data generating device 10 further includes a communication section 19. The communication section 19 transmits and/or receives data to and/or from the display device 20.

The display device 20 includes a controller 22, storage 24, and a display section 26. The controller 22 controls the display section 26. A browser application is stored in the storage 24. Examples of the browser application include "GOOGLE CHROME (U.S. registered trademark)" and "Safari (U.S. registered trademark)".

The controller 22 includes a processor. The processor includes for example a central processing unit (CPU). Alternatively, the processor may include a general-purpose arithmetic unit.

The storage 24 stores therein image data. The storage 24 includes main memory and an auxiliary storage device. The main memory is for example semiconductor memory. Examples of the auxiliary storage device include semiconductor memory and a hard disk drive. The storage 24 may include a removable medium. The image data includes color signals. For example, each of the color signals is represented by RGB.

The display section 26 displays an image. The controller 22 controls the display section 26 so that the display section 26 displays an image according to the image data stored in the storage 24. For example, the controller 22 controls the display section 26 so that display section 26 displays a display screen of the browser application.

Preferably, the display device 20 further includes a communication section 29. The communication section 29 transmits and/or receives data to and/or from the communication section 19 of the color difference adjustment image data generating device 10. Alternatively, the communication section 29 transmits and/or receives data to and/or from an external server.

The display section 16 displays an image of the display object T according to the image date ID stored in the storage 14. The display section 16 displays the image of the display object T according to the image date ID with the image data ID stored in the storage 14 not adjusted.

The image date ID is generated as a result of for example an image of the display object T being captured. A commercially available imaging device captures an image of the display object T, thereby generating the image data ID. The imaging device may be a digital video camera. Alternatively, the imaging device may be a smartphone, a mobile phone, or a tablet computer, having an imaging function.

Note that when the display section 16 displays an image according to the image data ID with the image data ID not adjusted, color of the image displayed by the display section 16 differs from the color of the display object T. Similarly, when the display device 20 displays an image according to the image data ID with the image data ID not adjusted, color of the image displayed by the display device 20 differs from the color of the display object T.

The color difference adjustment image data generating device 10 generates the adjusted image data AD of the display object T from the image data ID of the display object T. The adjusted image data AD includes color signals. Each of the color signals of the adjusted image data AD is represented by RGB. The adjusted image data AD is generated as a result of the image data ID being adjusted.

For example, the user changes values of color signals of the image data ID while confirming the image that the display section 16 displays according to the image data ID. The user changes the values of the color signals through for example the input section 18. Adjustment of the image data ID is performed until a color image of the display object T being displayed by the display section 16 according to the image data ID reproduces actual color of the display object T. In present specification, the image data ID adjusted until a color image being displayed by the display section 16 reproduces the color of the display object T may be referred to as the adjusted image data AD. The adjusted image data AD is obtained by adjusting the image data ID so as to allow the display section 16 to perform display with the color of the image of the display object T being calibrated. This enables the display section 16 to display an image that reproduces the color of the display object T based on the adjusted image data AD. As described above, the actual color of the display object T is reproduced by the image of the display object T being displayed by the display section 16 according to the adjusted image data AD.

Typically, even according to the same image data, color of an image displayed by the display section 26 of the display device 20 differs from color of an image displayed by the display section 16 of the color difference adjustment image data generating device 10. For example, if the display device 20 displays an image without converting the image data stored in the storage 24, color of an image displayed by the display section 26 of the display device 20 will differ from color of an image displayed by the display section 16 of the color difference adjustment image data generating device 10.

Therefore, using the color signal conversion table CST, the display device 20 converts color signals in one of the color difference adjustment image data generating device 10 and the display device 20 into color signals in the other. The storage 14 stores therein the color signal conversion table CST. The color signal conversion table CST enables a color image represented by the color signals in the display device 20 to reproduce color of an image represented by the color signals in the color difference adjustment image data generating device 10. When the display device 20 converts the color signals of the image data stored in the storage 14 according to the color signal conversion table CST to display an image, a color image displayed by the display section 26 of the display device 20 can reproduce color of an image displayed by the display section 16 of the color difference adjustment image data generating device 10. Note that the color signal conversion table CST is unique to the color difference adjustment image data generating device 10 and a type of the display device 20. Accordingly, if as the display device, a display device having different color characteristics is used, a different color signal conversion table needs to be separately generated.

The color difference adjustment image data generating device 10 generates the color difference adjustment image data CD based on the adjusted image data AD and the color signal conversion table CST. The color difference adjustment image data CD includes for example the adjusted image data AD and the color signal conversion table CST. In an example, the display device 20 employs the color signal conversion table CST as a color profile of the color difference adjustment image data CD. The color difference adjustment image data CD is generated by combining the adjusted image data AD and the color signal conversion table CST.

The display device 20 receives the color difference adjustment image data CD generated by the color difference adjustment image data generating device 10. The display device 20 can display an image of the display object T with color of the image being calibrated based on the color difference adjustment image data CD. The color difference adjustment image data CD generated in the color difference adjustment image data generating device 10 according to the present embodiment enables the display device 20 to display the color of the image of the display object T with high reproducibility.

Figure 2:
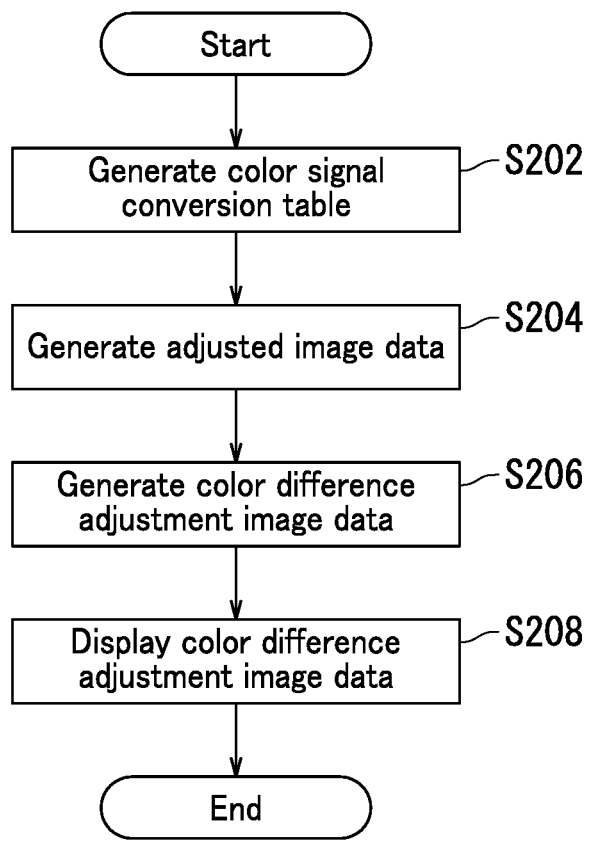
FIG. 2 is a flowchart depicting a color difference adjustment image display method implemented by the color difference adjustment image display system depicted in FIG. 1.

Here, the color difference adjustment image data generation method and a color difference adjustment image display method using the color difference adjustment image data generating device 10 according to the present embodiment will be described with reference to FIGS. 1 and 2. FIG. 2 is a flowchart depicting the color difference adjustment image display method according to the present embodiment. As depicted in FIG. 2, the color difference adjustment image display method according to the present embodiment includes Steps S202 to S208.

As depicted in Step S202, the color signal conversion table CST between the color difference adjustment image data generating device 10 and the display device 20 is first generated. The generated color signal conversion table CST is stored in the storage 14 of the color difference adjustment image data generating device 10. The color signal conversion table CST enables conversion of color signals in one of the color difference adjustment image data generating device 10 and the display device 20 into color signals in the other.

For example, the color signal conversion table CST can be generated by measuring color of an image that the color difference adjustment image data generating device 10 and the display device 20 display according to the same data. In an example, in the state where the display section 16 of the color difference adjustment image data generating device 10 displays an image according to standard color signal data containing different color signals, a colorimeter measures color attributes of the image displayed by the display section 16. Each of the color attributes includes for example Ev luminance and X, Y chromaticity. Similarly, in the state where the display section 26 of the display device 20 displays an image according to the standard color signal data containing the different color signals, the colorimeter measures color attributes of the image displayed by the display section 26. Note that the standard color signal data on the image displayed by the display section 26 of the display device 20 is the same as the standard color signal data on the image displayed by the display section 16.

Color of an image displayed by the display section 16 differs from color of an image displayed by the display section 26 of the display device 20 even when their respective images are displayed according to the same standard color signal data. For example, in the case where a color signal (R, G, B) in the standard color signal data is (255, 0, 0), let luminance and chromaticity (Ev, X, Y) of color displayed by the display section 16 be (15.0, 0.55, 0.30) and let luminance and chromaticity (Ev, X, Y) of color displayed by the display section 26 be (15.0, 0.60, 0.30). In addition, in the case where a color signal (R, G, B) in the standard color signal data is (240, 0, 0), let luminance and chromaticity (Ev, X, Y) of color displayed by the display section 16 be (15.0, 0.50, 0.30) and let luminance and chromaticity (Ev, X, Y) of color displayed by the display section 26 be (15.0, 0.55, 0.30).

In this case, if the color signal (R, G, B) in the display section 16 is (255, 0, 0) and the color signal (R, G, B) in the display section 26 is (240, 0, 0), the display sections 16 and 26 can display color of the same luminance and chromaticity (Ev, X, Y) that is equal to (15.0, 0.55, 0.30). That is, the color signal (R, G, B) in the color difference adjustment image data generating device 10, which is (255, 0, 0) is equivalent to the color signal (R, G, B) in the display section 20, which is (240, 0, 0). In this case, the color signal conversion table CST includes a table for converting the color signal (R, G, B) in the color difference adjustment image data generating device 10, which is (255, 0, 0) into the color signal (R, G, B) in the display device 20, which is (240, 0, 0).

Similarly, in the case where a color signal (R, G, B) in the standard color signal data is (0, 255, 0), let luminance and chromaticity (Ev, X, Y) of color displayed by the display section 16 be (22.0, 0.15, 0.65) and let luminance and chromaticity (Ev, X, Y) of color displayed by the display section 26 be (22.0, 0.15, 0.70). In addition, in the case where another color signal (R, G, B) in the standard color signal data is (0, 240, 0), let luminance and chromaticity (Ev, X, Y) of color displayed by the display section 16 be (22.0, 0.15, 0.60) and let luminance and chromaticity (Ev, X, Y) of color displayed by the display section 26 be (22.0, 0.15, 0.65).

In this case, if the color signal (R, G, B) in the display section 16 is (0, 255, 0) and the color signal (R, G, B) in the display section 26 is (0, 240, 0), the display sections 16 and 26 can display color of the same luminance and chromaticity (Ev, X, Y) that is equal to (22.0, 0.15, 0.65). Therefore, the color signal (R, G, B) in the color difference adjustment image data generating device 10, which is (0, 255, 0) is equivalent to the color signal (R, G, B) in the display device 20, which is (0, 240, 0). In this case, the color signal conversion table CST includes a table for converting the color signal (R, G, B) in the color difference adjustment image data generating device 10, which is (0, 255, 0) into the color signal (R, G, B) in the display device 20, which is (0, 240, 0).

Note that the above numerical values are examples for facilitating understanding of the present embodiment, and are not actual values. Also, although luminance and chromaticity of an image pixel corresponding to a color signal in the display device 20 are equal to luminance and chromaticity of an image pixel corresponding to a different color signal in the color difference adjustment image data generating device 10 in the above description, the present invention is not limited to this. It is needed that luminance and chromaticity of an image pixel corresponding to a color signal in the display device 20 are close to luminance and chromaticity of an image pixel corresponding to a different color signal in the color difference adjustment image data generating device 10.

For example, a color difference $\Delta E$ between color of an image pixel corresponding to a color signal in the display device 20 and color of an image pixel corresponding to a different color signal in the color difference adjustment image data generating device 10 is preferably 6.0 or less, more preferably 4.5 less, and further preferably 3.0 or less. Alternatively, the color difference $\Delta E$ is furthermore preferably 1.5 or less. Note that $\Delta E = \{(\Delta L^*)^2 + (\Delta a^*)^2 + (\Delta b^*)^2\}^{1/2}$, where $L^* = 116 \times f(Y/Y_n) - 16$, $a^* = 500 \times [f(X/X_n) - f(Y/Y_n)]$, $b^*=200\times[f(Y/Y_n)-f(Z/Z_n)]$, and $f(t)=t^{1/3}$ when $t>(6/29)^3$, and $f(t)=[(29/3)^3 \times t+16]/116$ in other cases. Further, $X_n$, $Y_n$, and $Z_n$ are tristimulus values in CIE XYZ of white point.

As described above, the color signal conversion table CST can be generated by comparing color of an image corresponding to the color signals of the standard color signal data in the color difference adjustment image data generating device 10 and color of an image corresponding to the color signals of the standard color signal data in the display device 20. It is however unnecessary to measure color for each of all the color signals of image data in each of the color difference adjustment image data generating device 10 and the display device 20. Color signals to be measured may correspond to about 1000 different colors.

For example, in the case where the storage 14 of the color difference adjustment image data generating device 10 stores therein standard color signal data containing color signals indicating different colors, the display section 16 of the color difference adjustment image data generating device 10 may display an image containing the different colors according to the standard color signal data whereas the communication section 19 of the color difference adjustment image data generating device 10 may transmit the standard color signal data to the display device 20. In this case, the display section 26 of the display device 20 displays an image containing the different colors according to the standard color signal data. The colorimeter measures color of an image displayed by each of the display section 16 of the color difference adjustment image data generating device 10 and the display section 26 of the display device 20. Based on a result of the measurement, the colorimeter can accordingly generate a color signal conversion table CST between the color difference adjustment image data generating device 10 and the display device 20.

Note that a display screen of the display device 20 when the color signal conversion table CST is generated is preferably set to be constant except for color signals. By setting the display screen of the display device 20 to be constant, it is possible to reduce influence of color in the display device 20 except for the color signals. In addition, the display screen of the display device 20 when the color signal conversion table CST is generated is preferably set to maximum brightness.

Then, as depicted in Step S204, adjusted image data AD is generated by adjusting the image data ID. In the color difference adjustment image data generating device 10, the adjusted image data AD is generated by adjusting the image data ID.

The image data ID is stored in the storage 14 of the display section 16. The image data ID is obtained as a result of the imaging device capturing an image of the display object T. The controller 12 in the color difference adjustment image data generating device 10 controls the display section 16 so that the display section 16 displays an image according to the image data ID representing the image of the display object T. Although the image data ID is obtained as a result of the image of the display object T being captured, it cannot be said that a color image displayed by the display section 16 according to the image data ID reproduces the color of the display object T itself. Therefore, generating the adjusted image data AD by adjusting the image data ID so that color of an image displayed by the display section 16 approaches the actual color of the display object T enables the display section 16 to display an image that reproduces the color of the display object T.

Each of the image data ID and the adjusted image data AD includes color signals. For example, each of the color signals of the image data ID and the color signals of the adjusted image data AD is represented by RGB. Note that the adjusted image data AD is obtained by adjusting the image data ID, and therefore differs in RGB values from the image data ID.

A person may perform adjustment of the image data ID. Alternatively, the adjustment of the image data ID may be performed mechanically. For example, the colorimeter measures the color of the display object T and also adjusts the image data ID. Then, the colorimeter measures color of an image displayed by the display section 16 according to the image data ID adjusted. The colorimeter continues adjusting the image data ID until a result obtained by measuring the color of the image on the display section 16 approaches a result obtained by measuring the color of the display object T. In this way, the adjusted image data AD may be generated by adjusting the image data ID.

As depicted in Step S206, color difference adjustment image data CD is then generated based on the adjusted image data AD and the color signal conversion table CST. The color difference adjustment image data CD is generated in the color difference adjustment image data generating device 10. For example, the color difference adjustment image data CD is generated as a result of the adjusted image data AD and the color signal conversion table CST being combined.

For example, the communication section 19 of the color difference adjustment image data generating device 10 may transmit the color difference adjustment image data CD to the display device 20. Alternatively, the user may store, in a portable storage device, the color difference adjustment image data CD stored in the color difference adjustment image data generating device 10, and may carry the color difference adjustment image data CD to the display device 20 using the portable storage device.

Alternatively, the generated color difference adjustment image data CD may be uploaded onto a server accessible through for example the Internet. For example, the user uploads the color difference adjustment image data CD onto the server accessible over the Internet. In this case, a user who uploads the color difference adjustment image data CD onto the server may differ from a user when the color difference adjustment image data CD was generated. For example, the user who uploads the color difference adjustment image data CD onto the server may differ from a person, an organization, or an institution that has caused the device 10 to generate the color difference adjustment image data CD.

Then, as depicted in Step S208, the display device 20 displays an image CS of the display object T based on the color difference adjustment image data CD. The display device 20 displays the image CS of the display object T according to the color difference adjustment image data CD. Specifically, the display device 20 converts color signals of the adjusted image data AD in the color difference adjustment image data CD according to the color signal conversion table CST in the color difference adjustment image data CD to display the image CS of the display object T. Note that a user when an image of the display object T is displayed according to the color difference adjustment image data CD may differ from a person, an organization, or an institution that has uploaded the color difference adjustment image data CD onto the server. The color difference adjustment image display method according to the present embodiment is performed as described above.

Note that although one display device 20 performs display so that an image of one display object T is displayed with color of the image being calibrated in the description described above with reference to FIGS. 1 and 2, the present invention is not limited to this.

The color difference adjustment image data CD may be uploaded onto the server accessible over the Internet, thereby enabling display devices 20 of an unspecified number of third parties to display an image according thereto. However, a type or color characteristics of the display devices 20 of the unspecified number of third parties are preferably the same as a type or color characteristics of the display device 20 for which the color signal conversion table CST has been generated.

Figure 3:
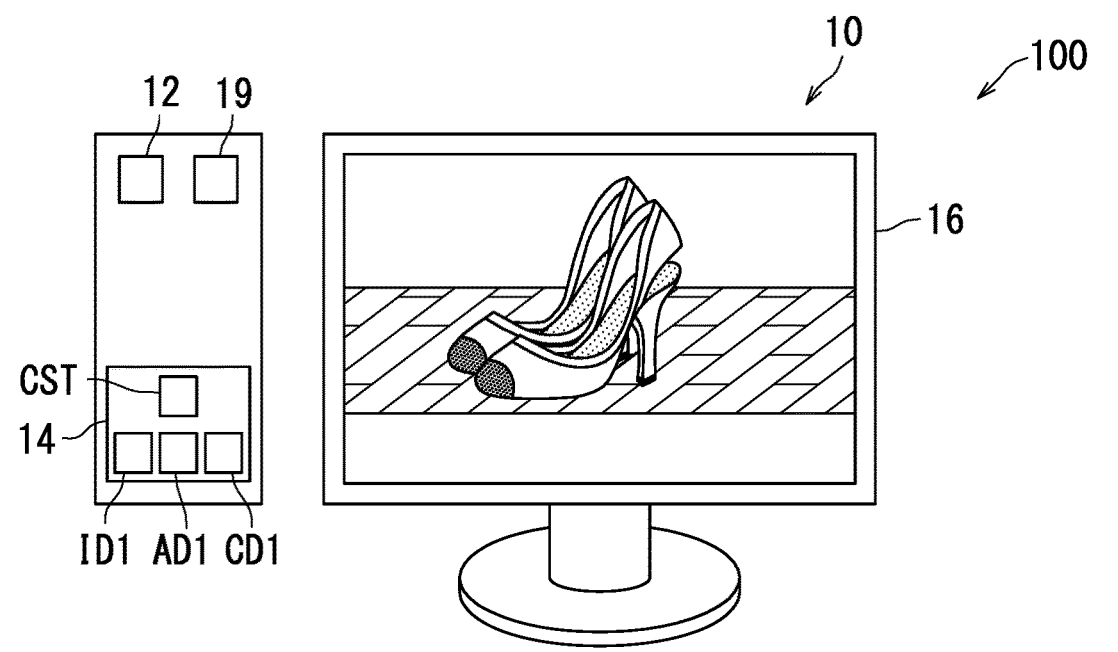
FIG. 3 is a schematic illustration of the color difference adjustment image display system according to the present embodiment.
Figure 3:
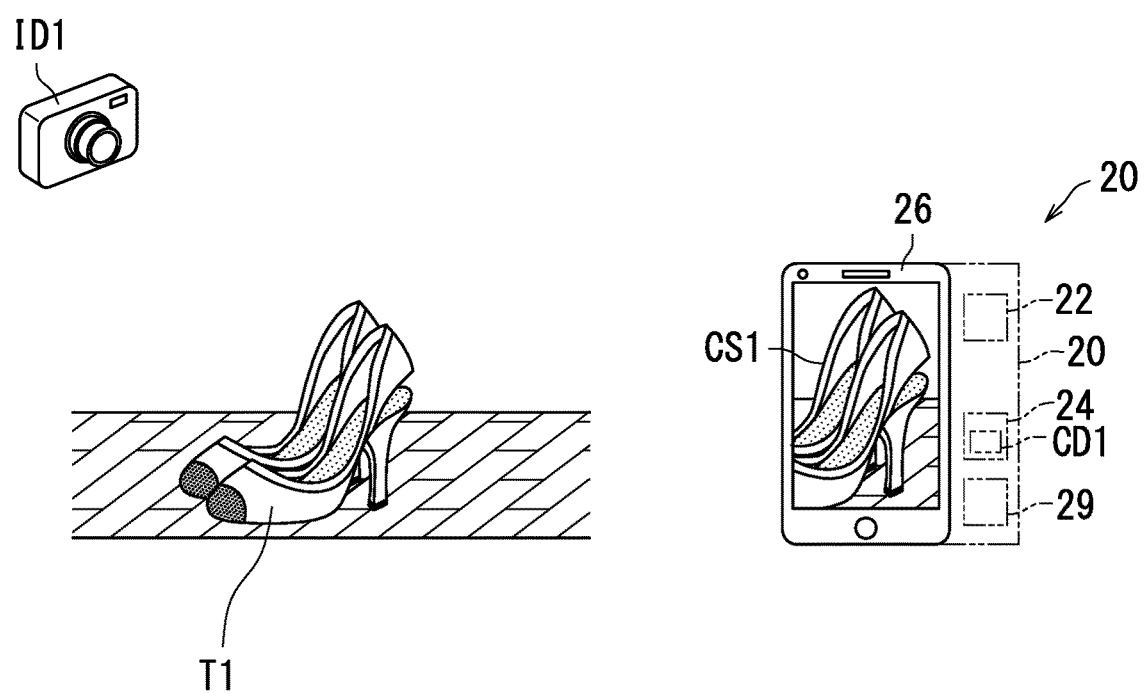

As illustrated in FIG. 3, in the case where the display device 20 displays an image of a different display object T with color of an image of the different display object T being calibrated, the color signal conversion table CST for converting color signals in one of the color difference adjustment image data generating device 10 and the display device 20 into color signals in the other can be applied as it is. For example, the color difference adjustment image data generating device 10 generates adjusted image data AD1 by adjusting image data ID1 of the display object T, and generates color difference adjustment image data CD1 based on the adjusted image data AD1 and the color signal conversion table CST. In this case, the color signal conversion table CST for converting color signals in one of the color difference adjustment image data generating device 10 and the display device 20 into color signals in the other is applicable to the display device 20 or a display device whose type and color characteristics are the same as a type and color characteristics of the display device 20.

Figure 4:
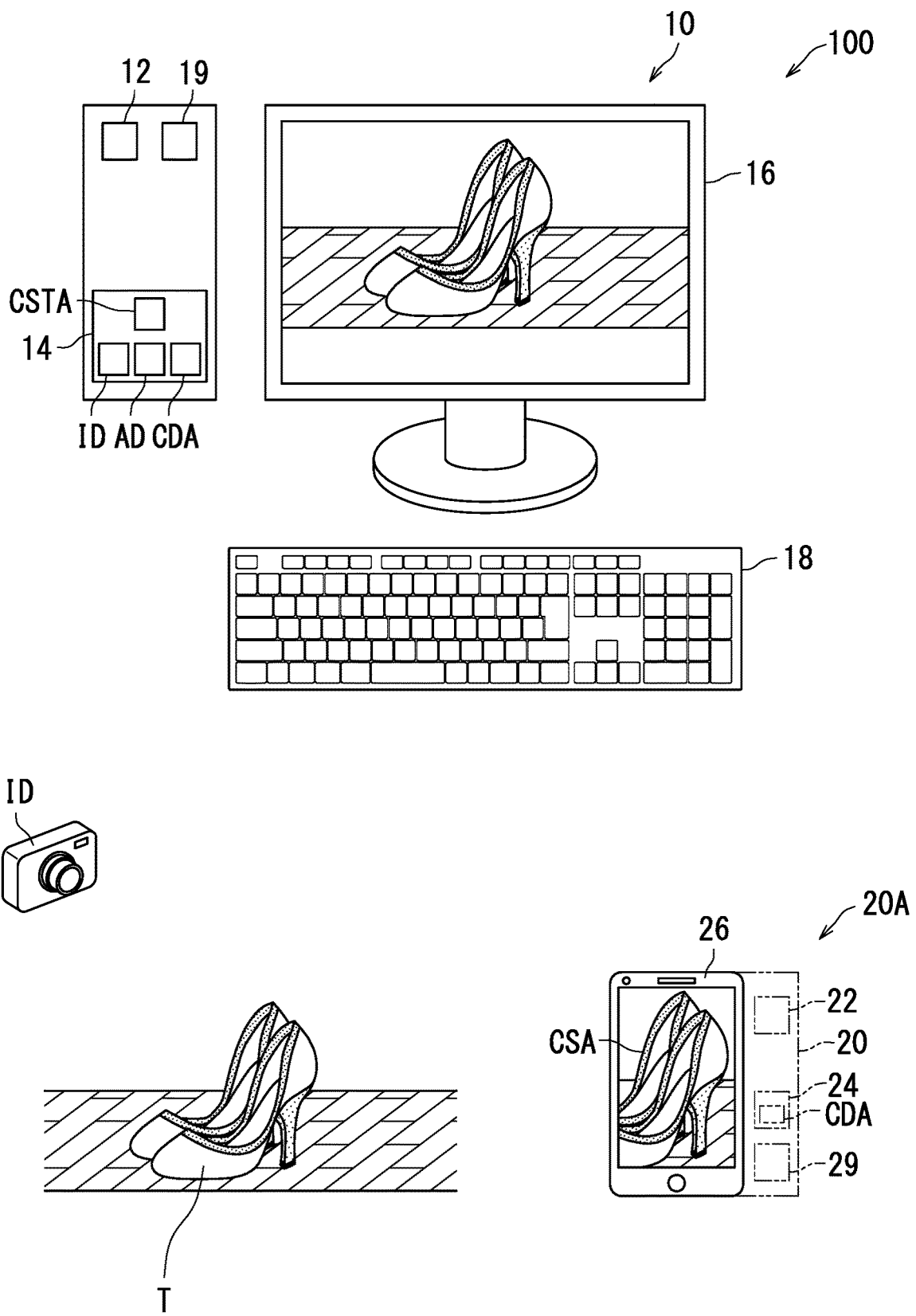
FIG. 4 is a schematic illustration of the color difference adjustment image display system according to the present embodiment.

In addition, although one display device 20 performs display so that an image of one display object T is displayed with color of the image being calibrated in the description described above with reference to FIGS. 1 and 2, the present invention is not limited to this. As illustrated in FIG. 4, in the case where another display device 20A displays an image of the display object T with color of the image of the display object T being calibrated, adjusted image data AD is applicable to image data ID of the same display object T.

For example, when the display device 20A has color characteristics different from color characteristics of the display device 20 associated therewith in the color signal conversion table CST, a color signal conversion table CSTA for color signal conversion from one of the color difference adjustment image data generating device 10 and the display device 20A into the other in order that the display device 20A displays an image of the display object T with the color of the image of the display object T being calibrated. In this case, the color difference adjustment image data generating device 10 may generate the color difference adjustment image data CDA based on the adjusted image data AD and the color signal conversion table CSTA. Thus, data obtained by the color difference adjustment image data generating device 10 adjusting the image data ID of the display object T can be employed as the adjusted image data AD.

Note that the color signal conversion table CST is applicable to the display device 20 itself or a display device whose type and color characteristics are the same as the type and the color characteristics of the display device 20. For example, when the color signal conversion table CST is used to convert color signals in one of the color difference adjustment image data generating device 10 and an iPhone (U.S. registered trademark) as the display device 20 into color signals in the other, the server onto which the color difference adjustment image data CD has been uploaded is accessed by the iPhone and then can cause the iPhone to display the image CS according to the color difference adjustment image data CD. In contrast, even when being accessed by a display device of an Android (U.S. registered trademark), the server cannot cause the display device to display the image CS according to the color difference adjustment image data CD. In this case, when being accessed by the display device of the Android, the server causes the display device to display an image according to the adjusted image data AD.

For example, when the server onto which the color difference adjustment image data CD has been uploaded is accessed by the display device 20 itself or a display device whose type and color characteristics are the same as the type and the color characteristics of the display device 20 as described above, the server can cause the display device 20 itself or the display device whose type and color characteristics are the same as the type and the color characteristics of the display device 20 to display an image CS according to the color difference adjustment image data CD. In contrast, when the server onto which the color difference adjustment image data CD has been uploaded is accessed by a display device other than the display device 20 itself or a display device whose type and color characteristics are the same as the type and the color characteristics of the display device 20, the server cannot cause the display device to display an image CS according to the color difference adjustment image data CD. Accordingly, when the server is accessed by the display device, the server can cause the display device to display an image according to the adjusted image data AD.

In display of the image CS of the display object T by the display device 20 according to the color difference adjustment image data CD, appearance of the image CS according to the color difference adjustment image data CD may differ depending on settings of the display screen of the display device 20. For example, when luminance in display settings of the display device 20 varies, the appearance of the image CS according to the color difference adjustment image data CD may vary. Therefore, the display device 20 preferably displays, with the same luminance, the image CS according to the color difference adjustment image data CD.

Figure 5:
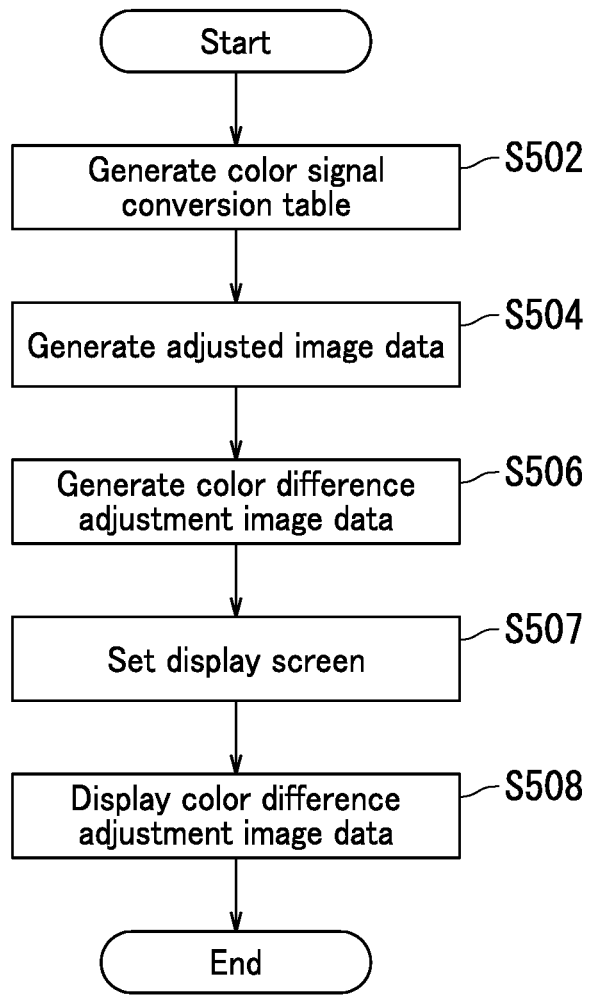
FIG. 5 is a flowchart depicting a color difference adjustment image display method implemented by the color difference adjustment image display system depicted in FIG. 1.

The color difference adjustment image display method using the color difference adjustment image data generating device 10 illustrated in FIG. 1 will next be described with reference to FIGS. 1 and 5. FIG. 5 is a flowchart depicting the color difference adjustment image display method according to the present embodiment. As depicted in FIG. 5, the color difference adjustment image display method according to the present embodiment includes Steps S502 to S508. Note that the flowchart depicted in FIG. 5 is similar to the flowchart described above with reference to FIG. 2 except that a step of setting a display screen of the display device 20 is added. Therefore, to avoid redundancy, duplicate description is omitted.

Steps S502 to S506 in the color difference adjustment image display method according to the present embodiment are similar to Steps S202 to S206 described above with reference to FIG. 2. A color signal conversion table CST is generated as depicted in Step S502, and adjusted image data AD is generated as depicted in Step S504. Color difference adjustment image data CD is subsequently generated as depicted in Step S506.

In the color difference adjustment image display method according to the present embodiment, a display screen of the display section 26 is set in Step S507 before an image of a display object T is displayed according to the color difference adjustment image data CD in Step S508. The display screen may be set by a user after the user requests the display device 20 to display the image of the display object T. For example, after the user requests the display device 20 to display the image of the display object T, the display device 20 may display a screen for setting the display screen for the display object T before the display device 20 displays the image of the display object T.

The display screen to be set is preferably a screen for setting brightness of the display device 20. For example, the display device 20 may request the user to set the display device 20 to the maximum brightness.

Figure 6:
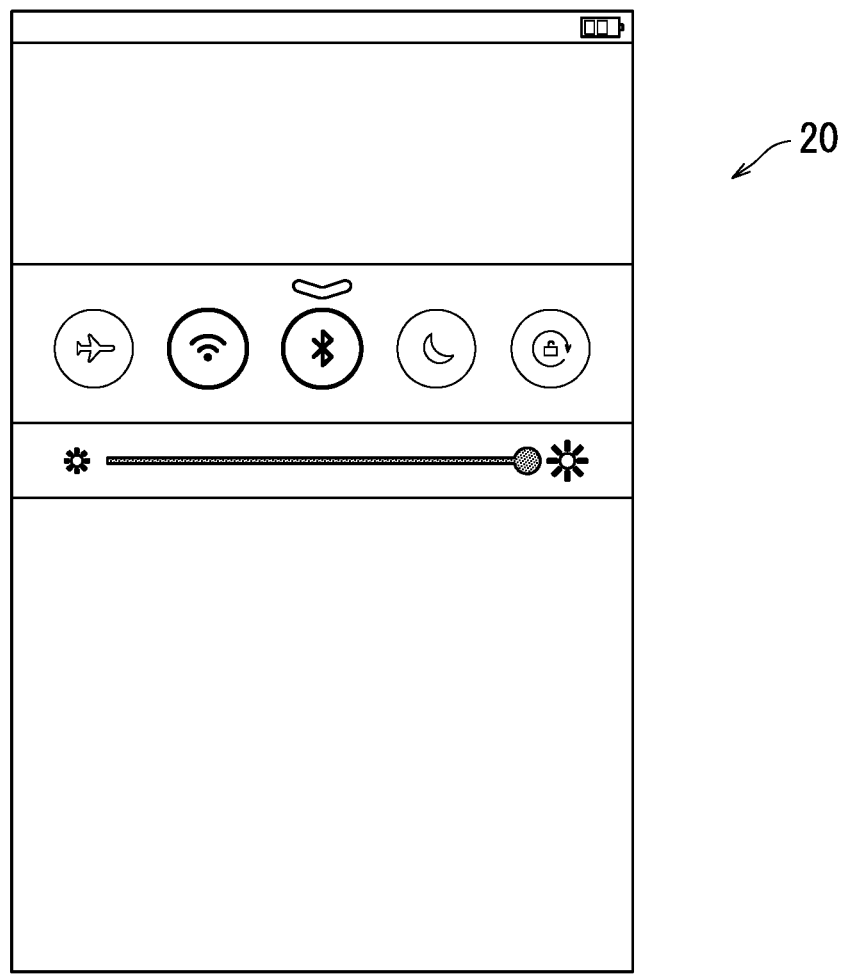
FIG. 6 is a schematic illustration depicting a display setting screen displayed on a display device, in the flowchart depicted in FIG. 5, of the color difference adjustment image display system according to the present embodiment.

FIG. 6 illustrates a screen prompting the user of the display device 20 to adjust the brightness of the display device 20. When the display device 20 accesses color difference adjustment image data CD, the display device 20 preferably displays a screen warning the user of the display device 20. Note that display settings of the display screen set in Step S507 are preferably the same as display settings of the display screen on which the display device 20 has displayed the standard color signal data in order to generate the color signal conversion table CST.

Alternatively, when displaying an image CS according to the color difference adjustment image data CD stored in the server, the display device 20 may automatically adjust the brightness of the display device 20. As described above, the display screen of the display device 20 is set before an image CS of the display object T is displayed according to the color difference adjustment image data CD.

The image CS of the display object T is subsequently displayed according to the color difference adjustment image data CD in Step S508. At this moment, the image CS of the display object T to be displayed on the display device 20 is displayed according to the display screen set in Step S507. A color image CS of the display object T displayed on the display device 20 can reproduce the color of the display object T.

As above, the embodiment of the present disclosure has been described with reference to the drawings (FIGS. 1 to 6). However, the present invention is not limited to the above embodiment and may be implemented in various manners within a scope not departing from the gist thereof. Furthermore, the constituent elements disclosed in the above-described embodiment may be altered as appropriate. For example, some of constituent elements disclosed in an embodiment may be added to constituent elements in another embodiment, or some of constituent elements depicted in an embodiment may be removed from the embodiment.

The drawings schematically illustrate constituent elements in order to facilitate understanding of the present disclosure. Aspects such as thickness, length, the number, and the like of each of constituent elements illustrated in the drawings may differ from actual aspects thereof in order to facilitate preparation of the drawings. Furthermore, constituent elements described in the above embodiment are merely examples and not particular limitations. The constituent elements may be variously altered within a scope not substantially departing from the effects of the present invention.

INDUSTRIAL APPLICABILITY

In the present invention, color of an image displayed by the display device can be calibrated so that a color image displayed by the display device reproduces color of a display object.

REFERENCE SIGNS LIST

10 Color difference adjustment image data generating device
12 Controller
14 Storage
16 Display section
18 Input section
20 Display device
22 Controller
24 Storage
26 Display section
100 Color difference adjustment image display system

The invention claimed is:

1. A color difference adjustment image data generation method comprising:
   generating a color signal conversion table, the color signal conversion table being for converting color signals in one of a color difference adjustment image data generating device and a display device into color signals in an other of the color difference adjustment image data generating device and the display device so that color of an image displayed by the display device according to standard color signal data matches color of an image displayed by the color difference adjustment image data generating device according to the standard color signal data;
   generating adjusted image data by adjusting image data of a display object obtained through capturing the display object so that color of an image of the display object being displayed by the color difference adjustment image data generating device according to the image data of the display object matches color of the display object with the image of the display object according to the image data of the display object being displayed by the color difference adjustment image data generating device; and
   generating color difference adjustment image data based on the adjusted image data and the color signal conversion table.

2. The color difference adjustment image data generation method according to claim 1, wherein
   in the generating color difference adjustment image data, the color difference adjustment image data contains the adjusted image data and the color signal conversion table.

3. The color difference adjustment image data generation method according to claim 1, wherein
   the generating a color signal conversion table includes
   measuring color of an image that the color difference adjustment image data generating device displays according to the standard color signal data;
   measuring color of an image that the display device displays according to the standard color signal data; and
   generating the color signal conversion table so that the color of the image displayed by the display device matches the color of the image displayed by the color difference adjustment image data generating device.

4. The color difference adjustment image data generation method according to claim 1, wherein
   the generating adjusted image data includes
   capturing the image of the display object to generate the image data, and
   adjusting the image data to generate the adjusted image data.

5. A color difference adjustment image display method comprising:

generating a color signal conversion table, the color signal conversion table being for converting color signals in one of a color difference adjustment image data generating device and a display device into color signals in an other of the color difference adjustment image data generating device and the display device so that color of an image displayed by the display device according to standard color signal data matches color of an image displayed by the color difference adjustment image data generating device according to the standard color signal data;

generating adjusted image data by adjusting image data of a display object obtained through capturing the display object so that color of an image being displayed by the color difference adjustment image data generating device according to the image data of the display object matches color of the display object with the image of the display object according to the image data of the display object being displayed by the color difference adjustment image data generating device;

generating color difference adjustment image data based on the adjusted image data and the color signal conversion table; and causing the display device to display an image of the display object based on the color difference adjustment image data.

6. The color difference adjustment image display method according to claim 5, further comprising setting a display screen of the display device before the causing the display device to display an image of the display object.

7. The color difference adjustment image display method according to claim 6, wherein in the setting a display screen of the display device, the display screen of the display device is set to be the same as a display screen of the display device when the color signal conversion table was generated.

8. The color difference adjustment image data generation method according to claim 1, wherein in the generating color difference adjustment image data, the color difference adjustment image data is generated by combining the adjusted image data and the color signal conversion table.

9. The color difference adjustment image display method according to claim 5, wherein in the generating color difference adjustment image data, the color difference adjustment image data is generated by combining the adjusted image data and the color signal conversion table.

10. The color difference adjustment image data generation method according to claim 1, wherein in the generating color signal conversion table, the color of the image displayed by the display device according to the standard color signal data is measured by a colorimeter, and the color of the image displayed by the color difference adjustment image data generating device according to the standard color signal data is measured by a colorimeter.

11. The color difference adjustment image display method according to claim 5, wherein in the generating a color signal conversion table, the color of the image displayed by the display device according to the standard color signal data is measured by a colorimeter, and the color of the image displayed by the display section according to the standard color signal data is measured by a colorimeter.

12. A color difference adjustment image data generating device comprising:

storage;

a display section; and a controller configured to control the display section, wherein the storage stores image data of a display object obtained through capturing the display object, the storage stores a color signal conversion table, the color signal conversion table being for converting color signals in one of the color difference adjustment image data generating device and a display device into color signals in an other of the color difference adjustment image data generating device and the display device so that color of an image displayed by the display device according to standard color signal data matches color of an image displayed by the display section according to the standard color signal data, the controller causes the display section to display an image of the display object according to the image data of the display object;

generates adjusted image data by adjusting the image data so that color of the image of the display object being displayed by the display section according to the image data of the display object matches color of the display object; and causes the storage to store the adjusted image data, and the controller generates color difference adjustment image data based on the adjusted image data and the color signal conversion table.

13. The color difference adjustment image data generating device according to claim 12, wherein the controller combines the adjusted image data and the color signal conversion table to generate the color difference adjustment image data.

14. A color difference adjustment image display system comprising:

a color difference adjustment image data generating device; and a display device, wherein the color difference adjustment image data generating device stores image data of a display object obtained through capturing the display object and the color difference adjustment image data generating device stores a color signal conversion table, the color signal conversion table being for converting color signals in one of the color difference adjustment image data generating device and the display device into color signals in an other of the color difference adjustment image data generating device and the display device so that color of an image displayed by the display device according to standard color signal data matches color of an image displayed by the color difference adjustment image data generating device according to the standard color signal data, the color difference adjustment image data generating device generates adjusted image data by adjusting the image data so that color of an image of the display object being displayed by the color difference adjustment image data generating device according to the image data of the display object matches color of the display object with the image of the display object according to the image data of the display object being displayed by the color difference adjustment image data generating device, the color difference adjustment image data generating device generates color difference adjustment image data based on the adjusted image data and the color signal conversion table, and the display device displays an image of the display object based on the color difference adjustment image data.

15. The color difference adjustment image display system according to claim 14, wherein the color difference adjustment image data generating device combines the adjusted image data and the color signal conversion table to generate the color difference adjustment image data.

* * * * *